US010368402B2

(12) United States Patent
Bullo et al.

(10) Patent No.: US 10,368,402 B2
(45) Date of Patent: Jul. 30, 2019

(54) MICROWAVE HEATING DEVICE AND METHOD FOR OPERATING A MICROWAVE HEATING DEVICE

(71) Applicant: ILLINOIS TOOL WORKS INC., Glenview, IL (US)

(72) Inventors: Marco Bullo, Scorzé (IT); Nicola Lanza, Chioggia (IT); Chiara DeMassari, Costermano (IT); Francesco Gambato, San Giogio in Bosco (IT); Fabrizio Dughiero, Padua (IT); Benoit Flipot, La Bazouge des Alleux (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 182 days.

(21) Appl. No.: 15/459,456

(22) Filed: Mar. 15, 2017

(65) Prior Publication Data

US 2017/0290104 A1    Oct. 5, 2017

Related U.S. Application Data

(60) Provisional application No. 62/317,039, filed on Apr. 1, 2016.

(51) Int. Cl.
*H05B 6/64* (2006.01)
*H05B 6/68* (2006.01)
*H05B 6/70* (2006.01)

(52) U.S. Cl.
CPC .......... *H05B 6/6438* (2013.01); *H05B 6/687* (2013.01); *H05B 6/705* (2013.01); *Y02B 40/146* (2013.01)

(58) Field of Classification Search
CPC ....... H05B 6/6438; H05B 6/705; H05B 6/687
(Continued)

(56) References Cited

U.S. PATENT DOCUMENTS 4,196,332 A    4/1980   Mackay et al.
4,795,871 A *  1/1989   Strattan ................ D06F 58/266
                                                        219/707
(Continued)

FOREIGN PATENT DOCUMENTS

EP    2434837 A1    3/2012
EP    2528415 A2   11/2012
(Continued)

OTHER PUBLICATIONS

International Search Report and Written Opinion of PCT/US2017/025024 dated Jun. 20, 2017, all enclosed pages cited.

*Primary Examiner* — Quang T Van
(74) *Attorney, Agent, or Firm* — Burr Forman McNair (57) ABSTRACT

A microwave heating device and a method for operating a microwave heating device to heat a product inside a heating chamber includes at least two radiating portions that are adapted to radiate microwaves to the heating chamber and can be operated according to a plurality of operational configurations that differ in frequency or phase shift(s) between the radiated microwaves. A learning procedure can be executed by sequentially operating the radiating portions in several operational configurations for which energy efficiency data are calculated. An operating frequency can be selected via an algorithm that optimizes a mathematical function based on energy efficiency data. An operational configuration with a maximum energy efficiency at the selected operating frequency may be taken as a reference. A heating procedure can be executed by sequentially operating the radiating portions in operational configurations having the selected operating frequency and respective phase shift(s) chosen around the respective phase shift(s) of the reference operational configuration.

20 Claims, 6 Drawing Sheets

(58) Field of Classification Search
USPC ....... 219/748, 702, 707, 716, 717, 709, 756, 219/761, 749, 750, 698; 34/259
See application file for complete search history.

(56) References Cited

U.S. PATENT DOCUMENTS

| | | | | |
|---|---|---|---|---|
| 2010/0176121 | A1* | 7/2010 | Nobue | H05B 6/686 219/716 |
| 2010/0252551 | A1* | 10/2010 | Nordh | H05B 6/74 219/702 |
| 2011/0168699 | A1* | 7/2011 | Oomori | H01L 21/67115 219/748 |
| 2013/0256302 | A1 | 10/2013 | Chu et al. | |

FOREIGN PATENT DOCUMENTS

| | | |
|---|---|---|
| JP | 2008034244 A | 2/2008 |
| WO | 95/27388 A1 | 10/1995 |

* cited by examiner

MICROWAVE HEATING DEVICE AND METHOD FOR OPERATING A MICROWAVE HEATING DEVICE

CROSS-REFERENCE TO RELATED APPLICATIONS

This application claims priority to U.S. provisional application No. 62/317,039 filed Apr. 1, 2016, the entire contents of which are hereby incorporated by reference.

TECHNICAL FIELD

This disclosure relates in general to the field of electromagnetic heating. Specifically, this disclosure relates to a microwave heating device and a method for operating a microwave heating device, in particular for thawing and/or cooking food products.

BACKGROUND

At present there are many known and widely-used techniques for heating a food product, both for thawing and for cooking.

According to some known heating techniques, the food product receives heat through its outer surface, which exchanges heat with an external heating element or with an external environment which is at a higher temperature. In these techniques, the flow of heat inside the food product is determined by the temperature gradient and by thermal diffusivity of the food product itself.

According to other known heating techniques, heat is generated directly inside the food product by means of electromagnetic fields or electromagnetic radiations. Amongst these, some techniques use radio frequency (RF) dielectric heating and other techniques use microwaves (MW). Conventionally, radio frequency electromagnetic waves lie within the band of frequencies between 1 and 300 MHz, whilst microwaves lie within the band of frequencies between 300 MHz and 300 GHz. In particular, radio frequency heating devices and microwave heating devices are known and widely utilized.

Electromagnetic heating techniques that use radio frequency or microwaves are generally useful for achieving shorter thawing or cooking times than techniques that use heat exchange through the surface of the food product. However, a problem common to many known electromagnetic heating techniques relates to the difficulty of obtaining a sufficiently homogeneous distribution of the temperature inside the food product.

Moreover, another problem of known electromagnetic heating techniques is encountered when several identical loads (or portions) of a food product are simultaneously heated. In these cases, it often occurs that the temperatures of the loads are not similar to each other at the end of the heating procedure, i.e., it is not possible to obtain an acceptable spatial uniformity of heating.

These problems normally seem to be more significant for microwave heating devices.

Therefore, it would be desirable to have available a heating technique, in particular using microwaves, which enables a reduction in the non-uniformity of temperature distribution in the food product and/or among loads of food product during heating thereof.

BRIEF SUMMARY OF SOME EXAMPLE EMBODIMENTS OF THE SUBJECT OF THE PRESENT DISCLOSURE

Specifically, this disclosure relates to a heating device and a method that use a microwave heating technique to heat at least one product. In particular modes of use, the at least one product is a food product and heating is intended to thaw and/or to cook and/or to merely heat the food product. However, the heating device and the method may also be utilized for other types of products.

In some example embodiments, the microwave heating device may comprise a heating chamber for receiving at least one product to be heated, a microwave generating system including at least two radiating portions adapted to radiate microwaves to the heating chamber, a control unit. The microwave generating system may generate and radiate, via the at least two radiating portions, respective microwaves having a same frequency and different phases. Therefore, one of the radiating portions may be taken as a reference radiating portion and the microwaves of the other radiating portion (or the other radiating portions, if the radiating portions are more than two) may have respective phase shift (or phase shifts) from the microwaves of the reference radiating portion. An operational configuration of the microwave generating system may be defined by the frequency value and the phase shift value (or values).

In some example embodiments, the microwave generating system may comprise four radiating portions. Consequently, each operational configuration may be defined by a frequency value and three phase shift values. The phase combinations of the operational configurations may be represented as points in a three-dimensional space of phase shifts.

The control unit may be configured to operate the microwave generating system and to change the frequency and the phase shift (or phase shifts) of the microwaves radiated by the microwave generating system. Thus, the at least two radiating portions can be operated according to a plurality of operational configurations that differ from one another in frequency and/or in phase shift (or phase shifts) between the radiated microwaves. An energy efficiency, which is inversely related to a ratio of reflected power over radiated power, is associated with each operational configuration. The microwave heating device may include a reflected power detecting system and the control unit may be configured to calculate that energy efficiency.

According to an aspect of the present disclosure, the control unit may be configured to operate the microwave generating system in such a way that a "stirring" of microwave distribution inside the heating chamber can be obtained during a heating procedure for the at least one product. That aim may be achieved by sequentially operating the microwave generating system in several operational configurations, each one having a selected operating frequency and respective phase shift(s) that are chosen around the corresponding phase shift(s) of a reference operational configuration. In other words, a virtual stirring may be generated by a phase rotation method.

As a matter of fact, a change of phase shifts of the microwaves emitted by the radiating portions would entail a change of interference patterns of microwaves inside the heating chamber and, in particular, a shift of constructive and destructive interference positions. Thus, the positions which receive peaks of radiated power may be moved over the to-be-heated product, or over several portions of the product, by using several operational configurations with different phase shifts. That is useful for creating a more even spatial distribution of electromagnetic heating power inside the heating chamber and for achieving an improved spatial uniformity for the electromagnetic energy given to the product or to several loads of product during the heating procedure.

One aspect of the present disclosure relates to the selection of the operating frequency for the heating procedure, as explained in the following.

According to one possible method of use, data of energy efficiency as a function of operational configurations may be obtained for the product or several loads positioned in the heating chamber. The obtained data may be processed by the control unit so that an operational configuration with a maximum energy efficiency and an operational configuration with a minimum energy efficiency are singled out for each frequency considered. For each frequency, an efficiency difference can be calculated as the difference between the maximum energy efficiency and the minimum energy efficiency. It should be noticed that maximum energy efficiency and minimum energy efficiency correspond with respective configurations that differ in phase shift(s) and have the same frequency. As an alternative option or a further option, a standard deviation of energy efficiency may be calculated for each frequency considered.

An operating frequency for heating may be selected as the frequency value that optimizes a mathematical function that includes efficiency difference and/or efficiency standard deviation at the same frequency. That optimization may be a maximization or a minimization of the mathematical function, depending on how the mathematical function is defined and on the underlying selection criterion.

The operational configuration with the maximum energy efficiency at the selected operating frequency may be selected as a reference operational configuration, in order to choose the operational configurations to be used in the heating procedure.

According to one possible method of use, the optimization is aimed at minimizing the efficiency difference. According to another possible method of use, the optimization is aimed at minimizing the efficiency standard deviation. These criteria may be useful because a limited worsening in energy efficiency may be encountered when operational configurations at a distance from the reference operational configuration with the maximum efficiency are adopted. According to an alternative criterion, the optimization is aimed at maximizing the efficiency difference.

According to another possible method of use, the optimization is aimed at minimizing a weighted sum of efficiency difference and efficiency standard deviation. According to a further possible method of use, the optimization is aimed at maximizing a weighted difference of efficiency difference and efficiency standard deviation.

Also the value of maximum energy efficiency at the same frequency may be considered in said optimization. In particular, frequencies with higher efficiency values may be favored.

It should be considered that, for each frequency, the energy efficiency generally has a rather smooth trend between the minimum value and the maximum value, when the operational configuration is changed. Thus, these methods for selecting the operating frequency are useful for choosing a frequency value that corresponds to a smoother trend. This may be useful for an improved spatial uniformity of heating.

According to some possible methods of use, each of those operational configurations for heating may have the selected operating frequency and respective phase shift(s) that is (are) within a phase shift distance from the corresponding phase shift(s) of the reference operational configuration.

The present inventors have experimentally verified that a microwave heating device operated according to the methods here described can reach a favorable spatial uniformity of heating, in particular when a plurality of identical loads are simultaneously heated.

In some example embodiments, the control unit may be configured to obtain energy efficiency data by running a learning procedure, after the at least one product has been positioned inside the heating chamber. During the learning procedure, frequency and phase shift(s) are changed to sequentially operate the at least two radiating portions in several operational configurations. For each frequency, a number of operational configurations differing in phase shift(s) from one another may be chosen and the at least two radiating portions may be operated in those chosen configurations. To be more specific, during the learning procedure the frequency is changed over a range and, for each frequency, a number of operational configurations differing in phase shift(s) from one another are chosen.

The energy efficiency may be calculated for each of said several operational configurations for the learning procedure and the obtained data of energy efficiency may be saved. In this way, data of energy efficiency as a function of operational configurations can be obtained for the at least one product in the heating chamber.

That is useful for directly obtaining information about how much the at least one product in the heating chamber interacts with microwaves and how such an interaction varies when frequency and/or phase shifts are changed. As a matter of fact, each product introduced in the heating chamber has features that differ from other products. Moreover, the interaction with the microwaves depends on the shape of the product and its position in the heating chamber.

In particular, the learning procedure may allow mapping of energy efficiency, as a function of frequency and phase shifts, for a specific group of identical loads to be heated simultaneously. The learning procedure is useful for best setting the operational configurations for that group of identical loads in the heating chamber. The short duration of the learning procedure does not influence the whole cooking process and the learning procedure may be repeated from time to time without any problem during cooking.

In other words, the learning procedure may implement an adaptive algorithm that allows adaptation of the heating procedure to the specific group of loads to be heated. The data obtained in the learning procedure may be used to choose the operational configurations for the heating procedure: during the heating procedure, the at least two radiating portions are sequentially operated according to the operational configurations that have been chosen on the basis of the data obtained in the learning procedure.

In other example embodiments, energy efficiency data may be already available to the control unit for that specific load or group of loads to be heated, without the need of a learning procedure. For example, those data could have been obtained for an identical load or group of loads during a previous learning procedure and were saved, so that the control unit may retrieve them when heating of an identical load or group of loads is required. In another example, those data could have been obtained and processed in a set-up phase for the microwave heating device and saved as a specific recipe for that particular load or group of loads. Thus, the operations of obtaining and processing energy efficiency data may be carried out only once for each load or group of loads and a specific recipe may be recalled for cooking a corresponding load or group of loads. These example embodiments may be suitable for particular types of loads that should be placed in certain fixed positions in the heating chamber of the microwave heating device. That may be useful in businesses such as fast food shops, where the range of products to be cooked is very limited and the loads of product, which can be placed always in the same positions in the heating chamber, are standardized in terms of quantity, shape and size.

BRIEF DESCRIPTION OF THE DRAWINGS

Having herein described the subject of this disclosure in general terms, further features and methods of use will become apparent in the following detailed description of some example embodiments, provided by way of example and without limiting the scope of the disclosure. Reference will be made to the appended figures, which are schematic drawings not necessarily to scale, in which.

DETAILED DESCRIPTION OF EXAMPLE EMBODIMENTS

Figure 1:
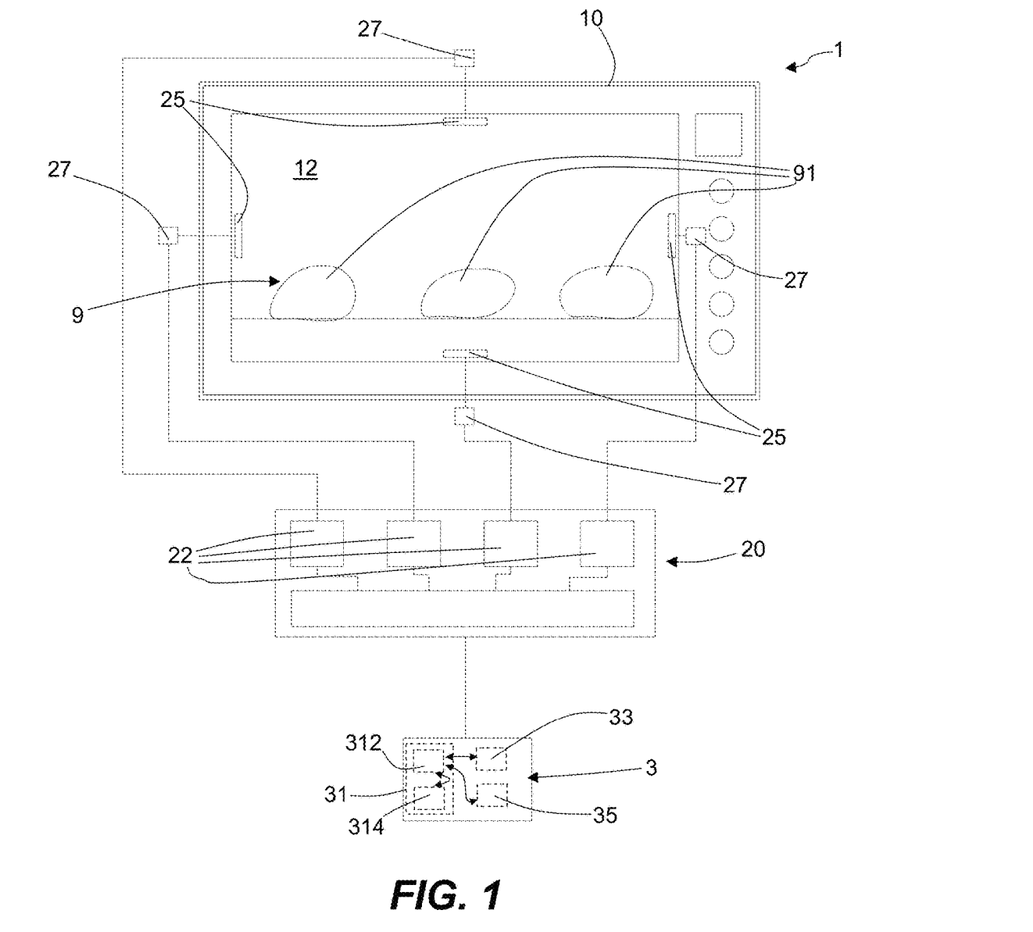
FIG. 1 is a schematic view of an example embodiment of a microwave heating device according to this disclosure, some components thereof being simply depicted as block elements.

An example embodiment of a microwave heating device according to this disclosure is labelled with the numeral 1 and is schematically illustrated in FIG. 1.

FIG. 1 shows several components of the heating device 1 in order to make this description easier to understand. Some components in dashed lines are shown outside a structure of the heating device 1 merely to allow a functional representation thereof. However, the figure should not be taken to be a precise and detailed technical drawing to be used for production purposes. Therefore, FIG. 1 does not show all of the components of the heating device 1 and shall not be considered to be a drawing in which the scale and proportions between the parts are faithfully reproduced.

The microwave heating device 1 may be used for heating at least one product 9, in particular at least one food product, e.g., a food, a dish, a piece of meat, a vegetable product. According to some modes of use, the microwave heating device 1 may be used for simultaneously heating several loads or portions of a product 9. Three loads of a food product are shown by way of example in FIG. 1 and are labelled 91. In the present description, any reference to "food product 9" should be understood as also referring to several loads 91 of product to be simultaneously heated.

According to some modes of use, the food product 9 to be heated may be a frozen (or deep-frozen) food product and the heating device 1 can be used to thaw such a frozen food product 9. According to other modes of use, the device 1 may be used to cook the food product 9.

The device 1 comprises a supporting structure 10, which for example comprises a box-shaped casing and/or a framework that supports the other components of the device 1. The device 1 also comprises a heating chamber 12 which is designed to receive the at least one food product 9 (in particular, the loads 91) to be heated. For example, the heating chamber 12 is located inside the supporting structure 10. The device 1 may comprise a door (not shown) that may alternatively be opened to allow access to the heating chamber 12 and closed to perform heating of the food product 9 in the closed heating chamber 12.

The device 1 comprises a control unit 3 and a microwave generating system 20 which includes at least two radiating portions 25. In the example embodiment in FIG. 1, the microwave generating system 20 comprises four of said radiating portions 25. In other example embodiments, the radiating portions 25 may be two, three or more than four.

The at least two radiating portions 25 are facing the heating chamber 12. The microwave generating system 20 is designed to generate microwaves and the at least two radiating portions 25 are adapted to radiate microwaves to the heating chamber 12.

In some embodiments, the microwave generation may be made by solid-state generators. To be more specific, the microwave generating system 20 comprises solid-state power amplifiers 22, each of them being connected with a respective radiating portion 25. The power amplifiers 22 may be controlled independently from one another, for example by the control unit 3, so that the signal generated by each of them may be controlled in terms of frequency, phase and amplitude. The generated signal is received by the respective radiating portion 25 to radiate a corresponding microwave. Thus, the microwaves radiated by the radiating portions 25 can be changed in frequency, phase and/or power.

The working range for microwave frequency may be between 300 MHz and 300 GHz. In particular, in some example embodiments the working range for microwave frequency may be between 2400 MHz and 2500 MHz. In some embodiment, the working range for microwave phases may be between 0° and 360°. In some embodiments, a maximum value for power provided by each power amplifier 22 may be 200 W. Obviously, lower or higher power values are possible in other example embodiments.

In some embodiments, the microwave generating system 20 may be designed to generate and radiate, via the at least two radiating portions, respective microwaves that have a same frequency and different phases.

In one example embodiment having two radiating portions, the two radiated microwaves may have phases that are different from each other. Thus, one radiating portion may be taken as a reference radiating portion and the microwaves radiated by the other radiating portion can have a phase shift from the microwaves radiated by the reference radiating portion.

In other example embodiments having more than two radiating portions, the radiated microwaves may have phases that are different from one another. Thus, one radiating portion may be taken as a reference radiating portion and the microwaves radiated by each of the other radiating portions can have a respective phase shift from the microwaves radiated by the reference radiating portion. In the specific example embodiment of FIG. 1 having four radiating portions 25, three phase shifts are defined.

The frequency value and the phase shift value (or values) identify or define an operational configuration of the microwave generating system 20. In other words, an operational configuration is a combination of frequency and phases that the microwave generating system 20 can be operated with. In the specific example embodiment with four radiating portions 25, each operational configuration is defined by a frequency value and three phase shift values.

In addition to the operational configuration defined by frequency and phases, the operative conditions of the microwave generating system 20 include also the power level at which the radiating portions 25 are set.

The control unit 3 may be configured to operate the microwave generating system 20 and to change the frequency and the phase shift(s) of the microwaves generated by the microwave generating system 20. In other words, the control unit 3 may be configured to set a plurality of operational configurations, according to which the microwave generating system 20 can be operated. Moreover, the control unit 3 may adjust the power level of each radiating portion 25. In particular, the radiating portions 25 may be operated with a same power level, i.e., the microwaves radiated by them may have all a same power.

During use of the microwave heating device 1, a radiated power is associated with the microwaves radiated by the radiating portions 25 and the radiated power is partially absorbed by the to-be-heated food product 9 located inside the heating chamber 12. An absorbed share of the radiated power is converted into heat in the food product 9, whereas a remaining share of the radiated power is reflected by the heating chamber 12.

In some embodiments, the microwave heating device 1 comprises a reflected power detecting system, which is configured to detect the share of radiated power that is reflected by the heating chamber 12. To be more specific, the reflected power detecting system may comprise a plurality of detectors 27, one for each radiating portion 25. Each detector 27 may be adapted to detect the microwave power that is returned back to the respective radiating portion 25 by the heating chamber 12.

For example, each detector 27 may be an electric-power detector that is positioned between a power amplifier 22 and the respective radiating portion 25. Moreover, radiated power (or forward power) may be detected or measured for each radiating portion 25. For example, the reflected power detecting system and radiated power detectors may be included in electronic circuitry of the microwave heating device 1.

In some embodiments, the control unit 3 may be connected with the reflected power detecting system (and also with the radiated power detectors) and may be configured to calculate an energy efficiency that is inversely related to a ratio of reflected power over radiated power. For example, radiated power ($P_{rad}$) may be calculated as a sum of individual powers radiated by the radiating portions 25; reflected power ($P_{ref}$) may be calculated as a sum of individual reflected powers detected by the detectors 27. Energy efficiency (Eff), in percentage, may be calculated as follows: Eff=$(1-P_{ref}/P_{rad})*100$.

The control unit 3 may be configured to calculate an energy efficiency value for each operational configuration of the microwave generating system 20.

Figure 2:
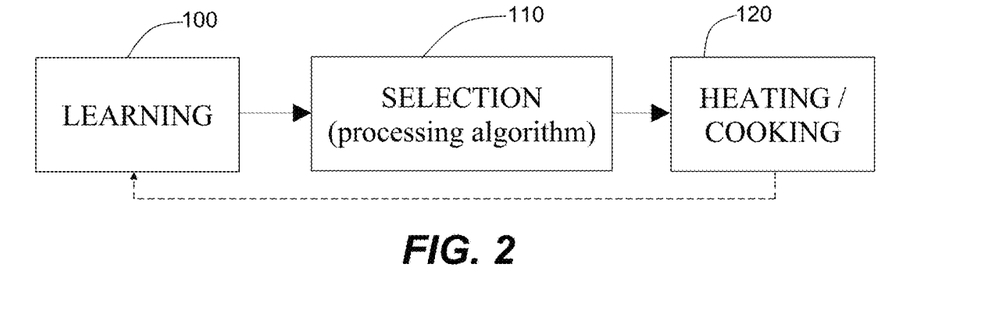
FIG. 2 is a block diagram of a possible method of use of a microwave heating device according to this disclosure.

As schematically shown in FIG. 2, a learning procedure 100, which is intended to "understand" the food product 9, may be executed before a heating procedure 120, which is intended to heat and/or cook the food product 9. A selection procedure 110 may be executed after the learning procedure 100 and before the heating or cooking procedure 120, in order to select the operational conditions for the subsequent heating procedure 120 on the basis of the results obtained in the learning procedure 100. The control unit 3 may be configured to run those procedures.

According to some methods of use, the learning procedure 100 may have a basic function of evaluating how the food product 9 in the heating chamber 12 interacts with microwaves, in order to allow a favorable setting of the parameters of the microwave generating system 20, that setting being tailored to the specific food product 9. In other words, the learning procedure 100 may be an inspection that aims at testing the food product 9 and identifying the best heating conditions for the food product 9 in the heating chamber 12. It should be noticed that the learning procedure 100 should be executed while the to-be-heated food product 9 is inside the heating chamber 12. Therefore, the food product 9 should be positioned in the heating chamber 12 before starting the learning procedure 100.

Basically, the learning procedure 100 may include applying to the food product 9 microwaves according to a plurality of different operational configurations, by sequentially operating the radiating portions 25 with different phases and different frequencies (but at the same time with the same frequency for all radiating portions 25).

During the learning procedure 100, the control unit 3 may operate the microwave generating system 20 with frequency and phase shift (or shifts) that are changed over respective ranges and the energy efficiency may be calculated for each of the corresponding operational configurations. In other words, a number of configurations are sequentially analyzed and energy efficiency is calculated for each configuration.

For example, frequency may be changed over a range between 2400 MHz and 2500 MHz, with a frequency step of 10 MHz. In other embodiments, frequency may be changed over the range between 300 MHz and 300 GHz. For each frequency, a number of combinations of phases may be chosen by changing phase shift (or shifts) over a respective phase range with a phase step. To be more specific, the phase range is an interval between 0° and 360° and the phase step may be constant over the interval. For example, the phase step is 45°. It should be taken into account that a phase shift of 0° is equivalent to a phase shift of 360°, then the corresponding operational configurations are to be considered only once.

Figure 3:
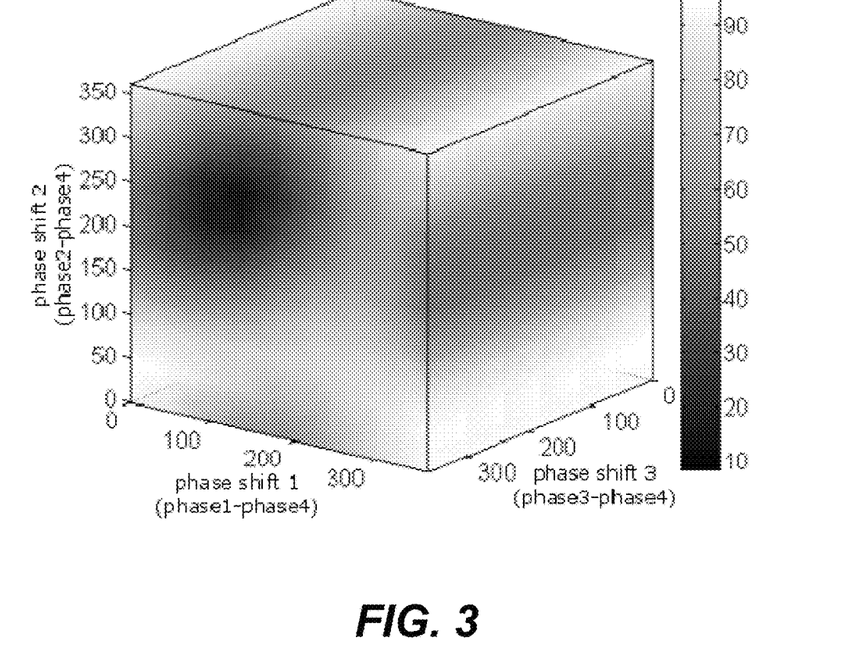
FIG. 3 is an exemplary graph relating to a possible method of use for a microwave heating device according to this disclosure.

The obtained data of energy efficiency for the chosen operational configurations may be electronically saved in order to allow a subsequent processing. For example, data are saved as a data matrix containing all the chosen operational configurations and the corresponding energy efficiency values. For example, FIG. 3 shows a three-dimensional space in which energy efficiency is mapped in greyscale as a function of three phase shifts.

Figure 4:
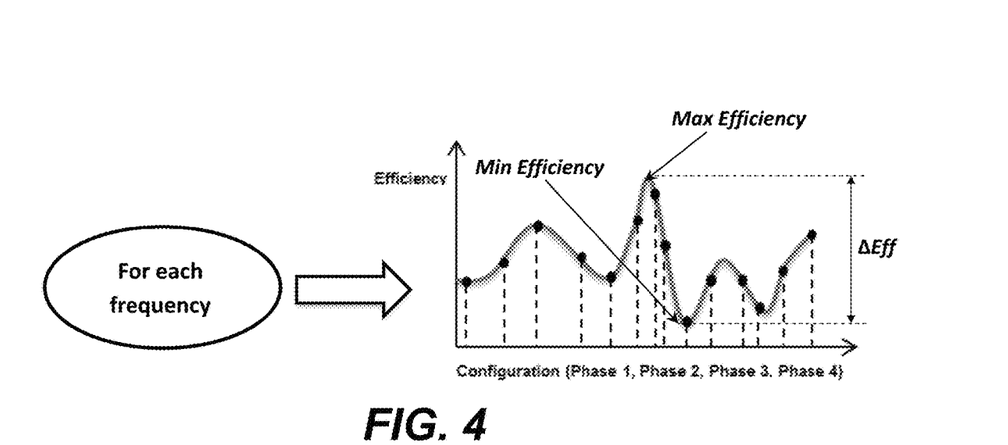
FIG. 4 is a schematic diagram of a possible method of use for a microwave heating device according to this disclosure.

Moreover, thanks to the learning procedure 100, for each frequency a graph of the trend of energy efficiency depending on the configurations (i.e., on the phases or phase shifts) may be obtained, as shown in FIG. 4. The graphs of FIGS. 3 and 4 are specific for the food product 9 in the heating chamber 12 and also depend on the technical features of the microwave heating device 1.

In particular, the control unit 3 may be configured to operate the microwave generating system 20 in the chosen operational configurations, to calculate the energy efficiency for each of the chosen operational configurations and to save the obtained data into an electronic data storage. In possible methods of use, the data obtained in the learning procedure 100 may be filtered in order to discard any operational configuration not complying with one or more additional requirements, so the operational configurations for the following selection procedure 110 may be less than the operational configurations for the learning procedure 100.

According to one method of use, the obtained data may be processed in the selection procedure 110, via a processing algorithm, to choose a plurality of operational configurations that can be used for heating the food product 9.

According to one aspect of the present disclosure, during execution of the selection procedure 110 an operating frequency is selected, a reference operational configuration at the operating frequency is selected, and a plurality of operational configurations are chosen around the reference operational configuration.

Some possible processing algorithms for selection of the operating frequency are here described.

An aspect common to these algorithms is that, for each frequency of the learning procedure 100, the energy efficiency data are analyzed to single out an operational configuration with a maximum energy efficiency and an operational configuration with a minimum energy efficiency. An efficiency difference ($\Delta$Eff) is calculated as the difference between the maximum value of energy efficiency (Max Efficiency) and the minimum value of energy efficiency (Min Efficiency), at the same frequency (see FIG. 4). A mathematical function $F(f)$ that includes efficiency difference is defined. The operating frequency is selected as the frequency value that optimizes that mathematical function.

It should be considered that, since the efficiency difference can be calculated for each frequency of the learning procedure 100, the mathematical function $F(f)$ depends on frequency $f$. Optimization of the mathematical function $F(f)$ includes finding the frequency value that optimizes (e.g., maximizes or minimizes) the value of the function $F(f)$ in the selected range of frequency.

According to a first algorithm (see FIGS. 5 and 6), the mathematical function is the efficiency difference, i.e., $F(f)=\Delta\text{Eff}(f)$, or is in a direct relation with the efficiency difference. Specifically, optimization is a minimization of that function. Thus, when running the algorithm, the control unit 3 is configured to select the operating frequency as the frequency that minimizes the efficiency difference. In other words, the selected operating frequency is the frequency with the lowest efficiency difference. According to a possible variation of the algorithm, optimization is a maximization of that function, i.e., the selected operating frequency is the frequency with the highest efficiency difference.

According to other algorithms, for each frequency of the learning procedure 100 the energy efficiency data are processed to calculate a mean value of energy efficiency at that frequency and a standard deviation from the mean value. Thus, the mathematical function $F(f)$ can include efficiency difference $\Delta\text{Eff}(f)$ and also the efficiency standard deviation $\sigma_{\text{Eff}}(f)$ at the same frequency. In particular, the mathematical function may include a linear combination of efficiency difference and efficiency standard deviation.

According to a second algorithm (see FIGS. 7 and 8), the mathematical function $F(f)$ is: $F(f)=\alpha\cdot\Delta\text{Eff}(f)+\beta\cdot\sigma_{\text{Eff}}(f)$, where $\alpha$ and $\beta$ are parameters greater than zero. According to this algorithm, optimization is a minimization of that function, i.e., the control unit 3 is configured to select the operating frequency as the frequency value that minimizes a weighted sum of efficiency difference and efficiency standard deviation. In particular, $\alpha$ and $\beta$ may have a same value, for example 0.5; in other cases, $\alpha$ and $\beta$ may have values different from one another.

According to a third algorithm (see FIGS. 9 and 10), the mathematical function $F(f)$ is: $F(f)=\alpha\cdot\Delta\text{Eff}(f)-\beta\cdot\sigma_{\text{Eff}}(f)$, where $\alpha$ and $\beta$ are parameters greater than zero. According to this algorithm, optimization is a maximization of that function, i.e., the control unit 3 is configured to select the operating frequency as the frequency value that maximizes a weighted difference of efficiency difference and efficiency standard deviation. In particular, $\alpha$ and $\beta$ may have a same value, for example 0.5; in other cases, $\alpha$ and $\beta$ may have values different from one another.

Other possible processing algorithms for selection of the operating frequency may consider the efficiency standard deviation $\sigma_{\text{Eff}}(f)$ without considering the efficiency difference $\Delta\text{Eff}(f)$. For example, the mathematical function may be the efficiency standard deviation, i.e., $F(f)=\sigma_{\text{Eff}}(f)$, or may be in a direct relation with the efficiency standard deviation. Specifically, optimization may be a minimization of that function. Thus, when running the algorithm, the control unit 3 may be configured to select the operating frequency as the frequency that minimizes the efficiency standard deviation. In other words, the selected operating frequency is the frequency with the lowest standard deviation of efficiency.

According to other algorithms, the mathematical function may include also the maximum energy efficiency Max_Eff $(f)$ at the same frequency, in such a way that maximum energy efficiency is positively weighted in optimization of said mathematical function. In other words, in the selection procedure 110 a frequency with a higher value of maximum energy efficiency would be preferred to frequencies with lower values of maximum energy efficiency, when the other terms of the mathematical function are roughly equivalent.

For example, a mathematical function to be minimized may be $F(f)=\alpha\cdot\Delta\text{Eff}(f)-\gamma\cdot\text{Max\_Eff}(f)$, where $\alpha$ and $\gamma$ are greater than zero, or $F(f)=\alpha\cdot\Delta\text{Eff}(f)+\beta\cdot\sigma_{\text{Eff}}(f)-\gamma\text{Max\_Eff}(f)$, where $\alpha$, $\beta$ and $\gamma$ are greater than zero, or $F(f)=\beta\cdot\sigma_{\text{Eff}}(f)-\gamma\cdot\text{Max\_Eff}(f)$, where $\beta$ and $\gamma$ are greater than zero. For example, a mathematical function to be maximized may be $F(f)=\alpha\cdot\Delta\text{Eff}(f)-\beta\cdot\sigma_{\text{Eff}}(f)+\gamma\cdot\text{Max\_Eff}(f)$, where $\alpha$, $\beta$ and $\gamma$ are greater than zero.

After selection of the operating frequency, the reference operational configuration can be selected as the operational configuration with the maximum energy efficiency at the selected operating frequency. Also this selection can be made on the basis of the data obtained in the learning procedure 100.

Moreover, a plurality of operational configurations for the heating procedure 120 may be chosen around the reference operational configuration. Each one of those heating operational configurations may have the selected operating frequency and respective phase shift (or shifts) that is (are) chosen around the respective phase shift (or shifts) of the reference operational configuration. Therefore, the heating procedure 120 may follow a phase stirring method around the reference operational configuration.

Figure 5:
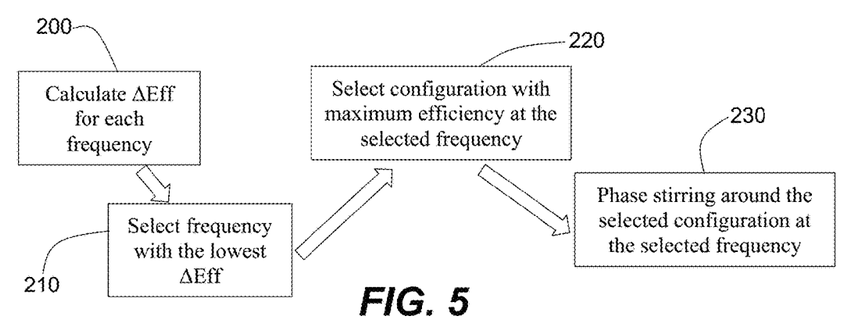
FIG. 5 is a block diagram of a first, possible processing algorithm of a selection procedure according to this disclosure.
Figure 6:
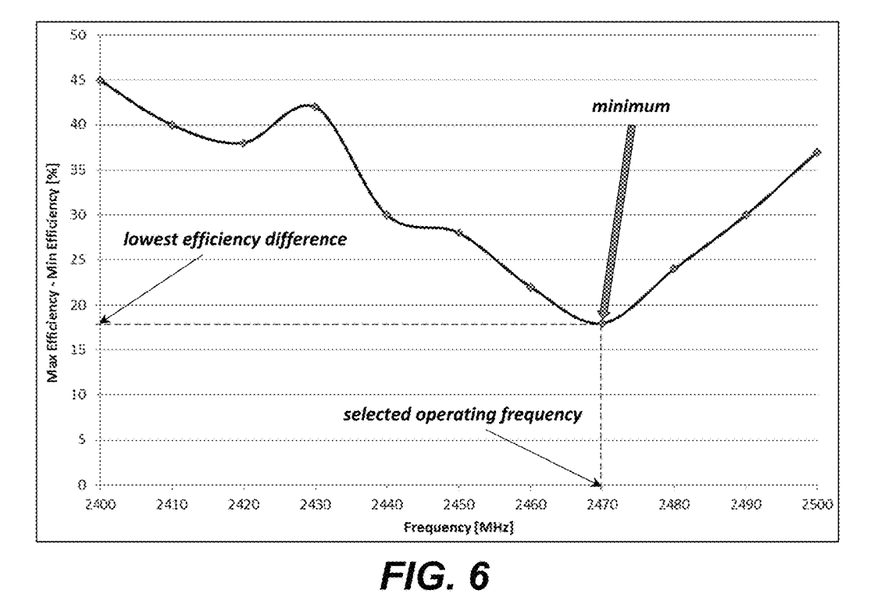
FIG. 6 is an exemplary graph relating to the selection procedure of FIG. 5.

A block diagram for that first algorithm is shown in the example of FIG. 5. Efficiency difference (ΔEff) may be calculated for each frequency at operation 200. The frequency value with the lowest efficiency difference may be selected at operation 210. The operational configuration with the maximum energy frequency at the selected frequency value may be selected at operation 220. Operational configurations that implement a phase stirring around the selected configuration at the selected frequency value may be chosen at operation 230.

Figure 7:
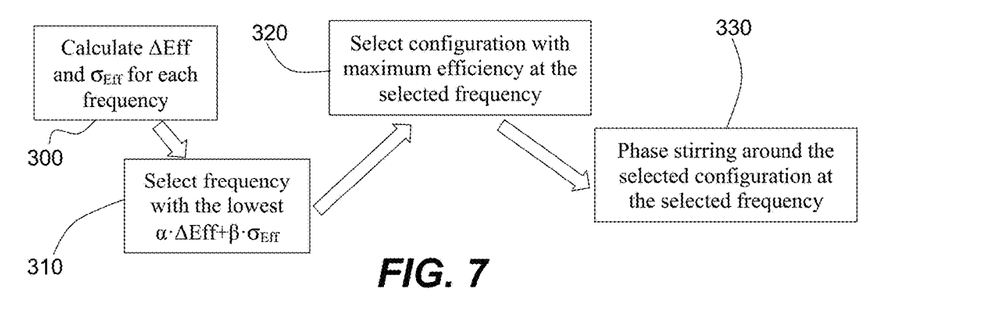
FIG. 7 is a block diagram of a second, possible processing algorithm of a selection procedure according to this disclosure.
Figure 8:
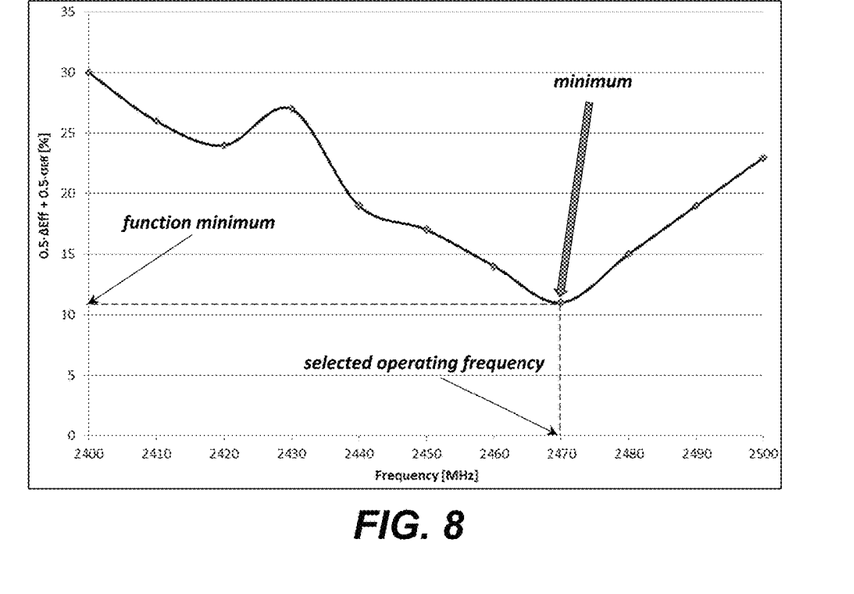
FIG. 8 is an exemplary graph relating to the selection procedure of FIG. 7.

A block diagram for that second algorithm is shown in the example of FIG. 7. Efficiency difference (ΔEff) and efficiency standard deviation ($\sigma_{Eff}$) may be calculated for each frequency at operation 300. The frequency value with the lowest value of $\alpha \cdot \Delta Eff + \beta \cdot \sigma_{Eff}$ may be selected at operation 310. The operational configuration with the maximum energy frequency at the selected frequency value may be selected at operation 320. Operational configurations that implement a phase stirring around the selected configuration at the selected frequency value may be chosen at operation 330. An exemplary graph for $\alpha=0.5$ and $\beta=0.5$ is shown in FIG. 8.

Figure 9:
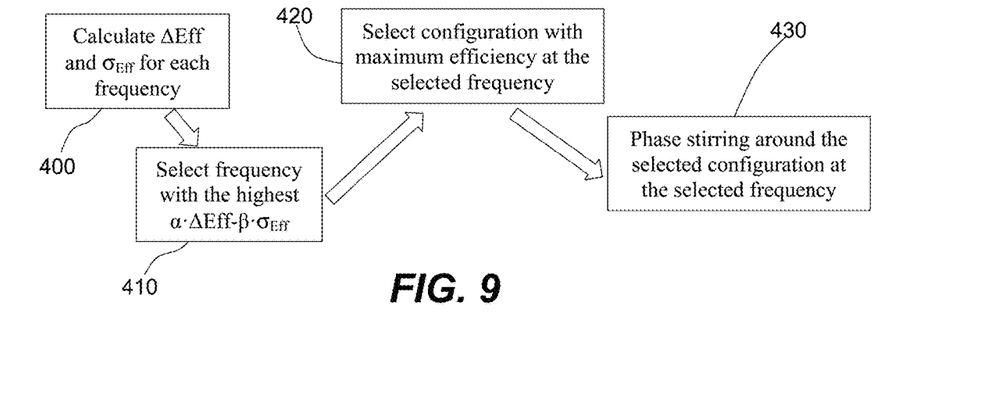
FIG. 9 is a block diagram of a third, possible processing algorithm of a selection procedure according to this disclosure.
Figure 10:
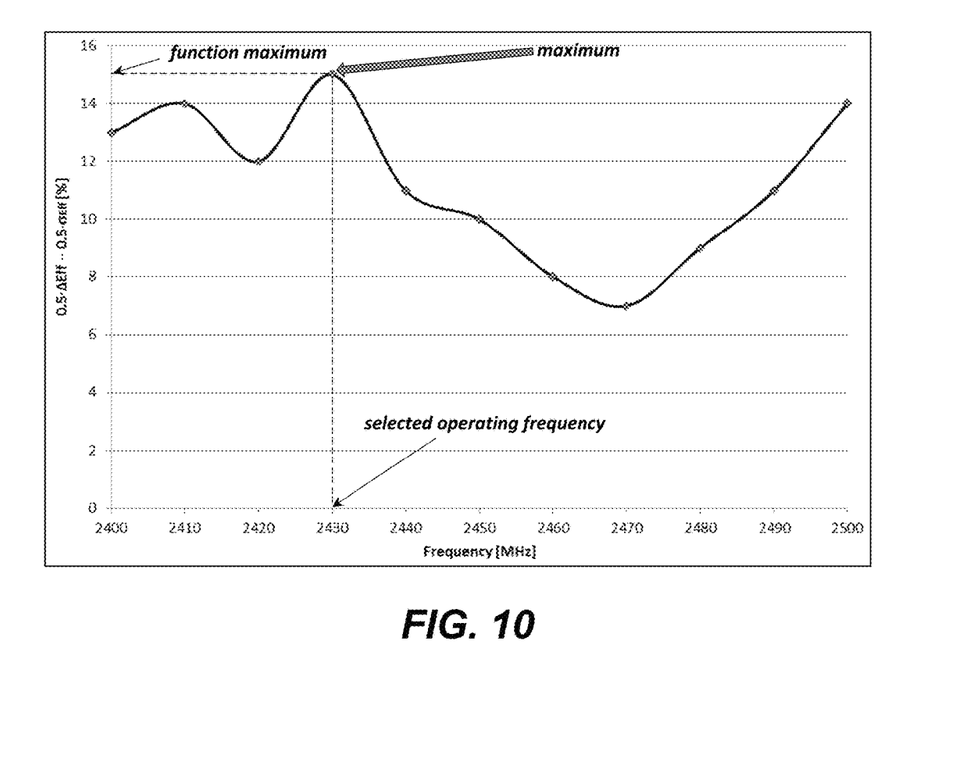
FIG. 10 is an exemplary graph relating to the selection procedure of FIG. 9.

A block diagram for that third algorithm is shown in the example of FIG. 9. Efficiency difference (ΔEff) and efficiency standard deviation ($\sigma_{Eff}$) may be calculated for each frequency at operation 400. The frequency value with the highest value of $\alpha \cdot \Delta Eff - \beta \cdot \sigma_{Eff}$ may be selected at operation 410. The operational configuration with the maximum energy frequency at the selected frequency value may be selected at operation 420. Operational configurations that implement a phase stirring around the selected configuration at the selected frequency value may be chosen at operation 430. An exemplary graph for $\alpha=0.5$ and $\beta=0.5$ is shown in FIG. 10.

Figure 11:
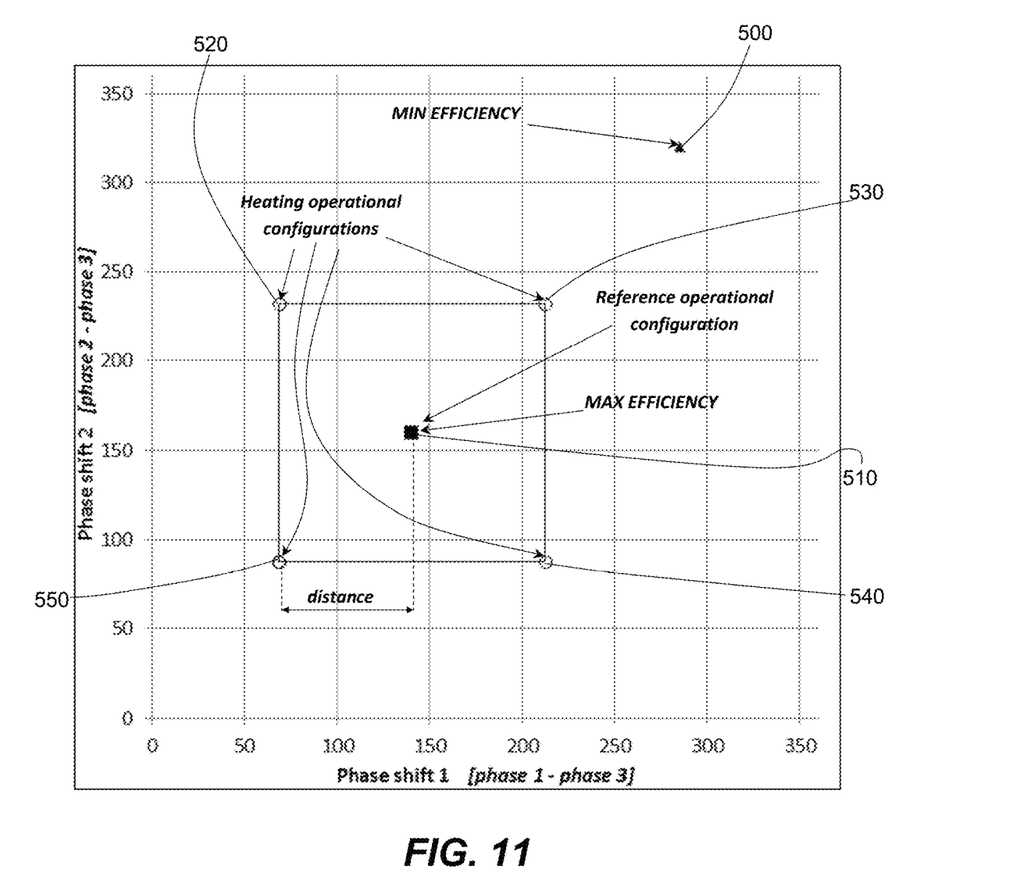
FIG. 11 is an exemplary graph relating to a heating procedure of a possible method of use for an example embodiment of a microwave heating device according to this disclosure.

The example of FIG. 11 refers to an embodiment comprising three radiating portions 25. As each operational configuration can be defined by a frequency value and two phase shift values, the operational configurations correspond with points in a two-dimensional space of the phase shifts.

In particular, the operational configurations chosen for the heating procedure 120 may have respective phase shifts that are within a phase shift distance from the respective, corresponding phase shifts of the reference operational configuration. In other words, the absolute value of the difference between each phase shift of any chosen operational configuration and the corresponding phase shift of the reference operational configuration may be lower than, or equal to, a preset value. The preset value is that phase shift distance. In FIG. 11 this is represented by the operational configurations chosen for the heating procedure 120 that are the vertices (labelled with the numerals 520, 530, 540, 550) of a square. The square is centered on the reference operational configuration, labelled with the numeral 510, which is the configuration with the maximum energy efficiency at the selected operating frequency. The configuration with the minimum energy efficiency at the selected operating frequency is labelled with the numeral 500.

In some embodiments, the control unit 3 may be configured to calculate the phase shift distance as a function of the efficiency difference for the selected operating frequency, in such a way that the phase shift distance is inversely related to the efficiency difference. A lower efficiency difference would entail a higher phase shift distance and wider phase stirring around the reference configuration, whereas a larger efficiency difference would entail a lower phase shift distance and a narrower phase stirring.

After said plurality of operational configurations have been chosen in the selection procedure 110, the at least two radiating portions 25 may be sequentially operated in said plurality of operational configurations during the heating procedure 120. According to some modes of use, during the heating procedure 120 each of the selected operational configurations may be applied for a same time, i.e., the overall heating time may be equally divided among the selected operational configurations.

According to some embodiments, the control unit 3 may be configured to operate the microwave generating system 20 with an adjustable power that is changed between the learning procedure 100 and the heating procedure 120. In particular, the radiated power in the learning procedure 100 may be lower than the radiated power in the heating procedure 120. In other words, during the learning procedure 100 the heating chamber 12 may be fed with microwaves having very low power (e.g., an overall power of 20 W), i.e., the power amplifiers 22 may be operated with reduced power (e.g., 5 W each). That may be useful for avoiding a significant heating or cooking of the food product 9 during the learning procedure 100. The learning procedure 100 may last a few seconds, which is a negligible time in comparison with an entire cooking time of several minutes. During the heating procedure 120 the heating chamber 12 may be fed with microwaves having high power, for example the power amplifiers 22 may be operated with power of 200 W.

In other embodiments or modes of use, avoiding a significant heating or cooking during the learning procedure 100 is not an issue. In some cases, for example, heating during the learning procedure 100 may be useful for reducing overall cooking time. Thus, in those cases the learning procedure 100 may be executed with power as high as in the heating procedure 120.

In some methods of use, the heating procedure 120 may be suspended at least one time to repeat the learning procedure 100, so that the heating procedure 120 may be continued with updated operational configurations. In other words, the learning procedure 100 and the heating procedure 120 can be alternately repeated more times for the same product 9 in the heating chamber 12, each heating procedure 120 being based on the data obtained in the preceding learning procedure 100 and processed in a selection procedure 110. That is useful for adapting the heating procedure 120 to the changing physical characteristics of the food product 9 during heating or cooking.

In some methods of use, the heating procedure 120 may comprise a plurality of successive steps, wherein the operating frequency for each step may be selected according to an algorithm different from the algorithms for the other steps. In other words, the mathematical function and the optimization criterion may not be the same ones for all the steps, so that the steps may differ from one another in the mathematical function and/or in the optimization criterion for selecting the operating frequency. Therefore, due to the changings in the mathematical function and/or in the optimization criterion, the steps may have different frequencies. For example, a first step may adopt a frequency that minimizes the efficiency difference, a second step may adopt a frequency that maximizes the efficiency difference, a third step may adopt a frequency that minimizes the efficiency standard deviation, a fourth step may adopt a frequency that minimizes a weighted sum of efficiency difference and efficiency standard deviation, a fifth step may adopt a frequency that maximizes a weighted difference of efficiency difference and efficiency standard deviation. This may be useful for an improved spatial uniformity of heating.

Each step may be applied for an equal time, the overall heating time being equally divided among the steps. For example, if the learning procedure 100 and the heating procedure 120 are alternately repeated more times for the same product 9 in the heating chamber 12, the criterion for selecting the operating frequency may be changed each time the learning procedure is executed.

As already mentioned, the control unit 3 may be configured to run the learning procedure 100, the selection procedure 110 and the heating procedure 120. In order to carry out those tasks, the control unit 3 may include processing circuitry 31 that may be configured to interface with, control or otherwise coordinate the operations of various components or modules described herein in connection with executing control over such component or modules as described herein. The control unit 3 may utilize the processing circuitry 31 to provide electronic control inputs to one or more functional units of the microwave generating system 20 and/or of the reflected power detecting system, to receive, transmit and/or process data associated with the one or more functional units and perform communications necessary to enable the ability to control operations of the microwave generating system 20 and/or of the reflected power detecting system (or components thereof) as described herein.

In some embodiments, the processing circuitry 31 may be embodied as a chip or chip set. In other words, the processing circuitry 31 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 31 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 31 may include one or more instances of a processor 312 and memory 314 (e.g., volatile or non-volatile memory) that may be in communication with or otherwise control a device interface 33 and a user interface 35. As such, the processing circuitry 31 may be embodied as a circuit chip (e.g., an integrated circuit chip) configured (e.g., with hardware, software or a combination of hardware and software) to perform operations described herein.

The device interface 33 may include one or more interface mechanisms for enabling communication with other devices. In some cases, the device interface 33 may be any means such as a device or circuitry embodied in either hardware, or a combination of hardware and software that is configured to receive and/or transmit data from/to devices or components (e.g., system components) in communication with the processing circuitry 31 via internal and/or external communication mechanisms. Accordingly, for example, the device interface 33 may further include devices and/or means for receiving data from the microwave generating system 20 and/or the reflected power detecting system and/or one or more sensors.

The subject matter of this disclosure may be modified and adapted in several ways without thereby departing from the scope of this disclosure. All details of the invention may be substituted with other technically equivalent elements and the materials used, as well as the shapes and dimensions of the various components, may vary according to requirements. It is therefore evident that the example embodiments described above are non-limiting and that other embodiments are possible, still being covered by the appended claims. Moreover, although the description and the drawings describe examples of combinations of elements and functions, it is evident that embodiments are possible that have different combinations of elements and functions, which in any case are covered by the teaching of this disclosure.

It should also be noticed that the advantages and benefits mentioned with reference to the example embodiments described above do not necessarily have to be present in all of the possible embodiments that are covered by the teaching of this disclosure. The specific terms used in the description are used with a generic and descriptive meaning, not with a limiting purpose.

The invention claimed is:

1. A microwave heating device, comprising:
   a heating chamber which is designed to receive at least one product to be heated;
   a microwave generating system designed to generate microwaves and including at least two radiating portions that are adapted to radiate microwaves to the heating chamber, a radiated power being associated with the radiated microwaves and, in use, a share of radiated power being reflected by the heating chamber; and
   a control unit;
   the microwave generating system being configured to radiate, via the at least two radiating portions, respective microwaves having a same frequency and different phases, wherein one of the radiating portions can be taken as a reference radiating portion and the microwaves radiated by the other radiating portion(s) can have respective phase shift(s) from the microwaves radiated by the reference radiating portion, the frequency value and the phase shift value(s) defining an operational configuration of the microwave generating system, an energy efficiency being associated with each operational configuration, the energy efficiency being inversely related to a ratio of reflected power over radiated power;
   the control unit being configured to operate the microwave generating system and to change the frequency and the phase shift(s) of the microwaves radiated by the microwave generating system;
   the control unit being configured to obtain data of energy efficiency, as a function of operational configurations, relating to the at least one product to be heated;
   the control unit being configured to run a selection procedure, in which:
      for each frequency in the obtained data of energy efficiency, data of energy efficiency are processed to calculate an efficiency difference and/or an efficiency standard deviation at that frequency, wherein, for the calculation of the efficiency difference, an operational configuration with a maximum energy efficiency and an operational configuration with a minimum energy efficiency at that frequency are singled out and the efficiency difference is calculated as the difference between the maximum energy efficiency and the minimum energy efficiency, and wherein, for the calculation of the efficiency standard deviation, a mean value of energy efficiency at that frequency is calculated and the standard deviation of energy efficiency at that frequency from the mean value is calculated;
      an operating frequency is selected, being the frequency value that optimizes a mathematical function that includes efficiency difference and/or efficiency standard deviation at the same frequency;

a reference operational configuration is selected, being the operational configuration with the maximum energy efficiency at the selected operating frequency;

a plurality of operational configurations are chosen, each one having the selected operating frequency and respective phase shift(s) that are chosen around the corresponding phase shift(s) of the reference operational configuration;

the control unit being configured to run a heating procedure, in which the microwave generating system is sequentially operated in said plurality of operational configurations chosen in the selection procedure.

2. The microwave heating device according to claim 1, wherein said mathematical function includes a linear combination of efficiency difference and efficiency standard deviation.

3. The microwave heating device according to claim 2, wherein said mathematical function is:

$$(f)=\alpha \cdot \Delta \mathit{Eff}(f)+\beta \cdot \sigma_{\mathit{Eff}}(f),$$

F($f$) being the mathematical function depending on frequency $f$, $\Delta \mathrm{Eff}(f)$ being the efficiency difference at frequency $f$, $\sigma_{\mathit{Eff}}(f)$ being the efficiency standard deviation at frequency $f$, $\alpha$ and $\beta$ being parameters greater than zero, the control unit being configured to select the operating frequency as the frequency value that minimizes said mathematical function.

4. The microwave heating device according to claim 2, wherein said mathematical function is:

$$(f)=\alpha \cdot \Delta \mathit{Eff}(f)-\beta \cdot \sigma_{\mathit{Eff}}(f),$$

F($f$) being the mathematical function depending on frequency $f$, $\Delta \mathrm{Eff}(f)$ being the efficiency difference at frequency $f$, $\sigma_{\mathit{Eff}}(f)$ being the efficiency standard deviation at frequency $f$, $\alpha$ and $\beta$ being parameters greater than zero, the control unit being configured to select the operating frequency as the frequency value that maximizes said mathematical function.

5. The microwave heating device according to claim 3, wherein $\alpha$ and $\beta$ have a same value.

6. The microwave heating device according to claim 1, wherein said mathematical function includes efficiency difference and the control unit is configured to select the operating frequency as the frequency value that minimizes the efficiency difference, or wherein said mathematical function includes efficiency standard deviation and the control unit is configured to select the operating frequency as the frequency value that minimizes the efficiency standard deviation.

7. The microwave heating device according to claim 1, wherein said mathematical function includes also the maximum energy efficiency at the same frequency, the maximum energy efficiency being intended to be positively weighted in optimization of said mathematical function.

8. The microwave heating device according to claim 1, wherein the operational configurations of said plurality chosen in the selection procedure have respective phase shift(s) that are within a phase shift distance from the corresponding phase shift(s) of the reference operational configuration.

9. The microwave heating device according to claim 8, wherein the control unit is configured to calculate the phase shift distance as a function of the efficiency difference for the selected operating frequency, the phase shift distance being inversely related to the efficiency difference.

10. The microwave heating device according to claim 1, comprising a reflected power detecting system that is configured to detect the share of radiated power that is reflected by the heating chamber, the control unit being configured to obtain data of energy efficiency by running a learning procedure in which frequency is changed over a range and, for each frequency, a number of operational configurations differing in phase shift(s) from one another are chosen, the control unit being configured to operate the microwave generating system in the chosen operational configurations and to calculate the energy efficiency for each of the chosen operational configurations.

11. The microwave heating device according to claim 1, wherein the control unit is configured to operate the microwave generating system with an adjustable power.

12. The microwave heating device according to claim 1, wherein the microwave generating system includes four radiating portions, each operational configuration being defined by a frequency value and three phase shift values.

13. A method for operating a microwave heating device, the microwave heating device comprising a heating chamber and at least two radiating portions that are adapted to radiate microwaves to the heating chamber, wherein the at least two radiating portions can be operated in a plurality of operational configurations that differ in frequency and/or in phase shift(s) between the radiated microwaves, an energy efficiency being associated with each operational configuration, the method comprising:

positioning at least one product in the heating chamber;

obtaining data of energy efficiency, as a function of operational configurations, relating to the at least one product in the heating chamber, the obtained data relating to a plurality of frequencies;

processing the obtained data so that, for each frequency of said plurality, an efficiency difference and/or an efficiency standard deviation are/is calculated, wherein, for the calculation of the efficiency difference, an operational configuration with a maximum energy efficiency and an operational configuration with a minimum energy efficiency at that frequency are singled out and an efficiency difference is calculated as the difference between the maximum energy efficiency and the minimum energy efficiency, and wherein, for the calculation of the efficiency standard deviation, a mean value of energy efficiency at that frequency is calculated and the standard deviation of energy efficiency at that frequency from the mean value is calculated;

selecting an operating frequency that optimizes a mathematical function that includes efficiency difference and/or efficiency standard deviation at the same frequency; and choosing a plurality of operational configurations for heating the at least one product, the chosen operational configurations having the selected operating frequency and respective phase shift(s) that are chosen around the corresponding phase shift(s) of the operational configuration having the maximum energy efficiency at the selected operating frequency.

14. The method according to claim 13, wherein the operating frequency is obtained by minimizing the efficiency difference, said mathematical function including efficiency difference, or wherein the operating frequency is obtained by minimizing the efficiency standard deviation, said mathematical function including efficiency standard deviation.

15. The method according to claim 13, wherein said mathematical function includes a linear combination of efficiency difference and efficiency standard deviation.

16. The method according to claim 15, wherein said mathematical function is: $(f)=\alpha \cdot \Delta \text{Eff}(f)+\beta \cdot \sigma_{\text{Eff}}(f)$, F(f) being the mathematical function depending on frequency $f$, $\Delta\text{Eff}(f)$ being the efficiency difference at frequency $f$, $\sigma_{\text{Eff}}(f)$ being the efficiency standard deviation at frequency $f$, $\alpha$ and $\beta$ being parameters greater than zero, the operating frequency being obtained by minimizing said mathematical function.

17. The method according to claim 15, wherein said mathematical function is: $(f)=\alpha \cdot \Delta \text{Eff}(f)-\beta \cdot \sigma_{\text{Eff}}(f)$, F(f) being the mathematical function depending on frequency $f$, $\Delta\text{Eff}(f)$ being the efficiency difference at frequency $f$, $\sigma_{\text{Eff}}(f)$ being the efficiency standard deviation at frequency $f$, $\alpha$ and $\beta$ being parameters greater than zero, the operating frequency being obtained by maximizing said mathematical function.

18. The method according to claim 13, wherein said mathematical function includes also the maximum energy efficiency at the same frequency, the maximum energy efficiency being positively weighted in optimization of said mathematical function.

19. The method according to claim 13, wherein said operational configurations for heating are chosen with respective phase shift(s) that are within a phase shift distance from the respective phase shift(s) of the operational configuration having the maximum energy efficiency at the selected operating frequency.

20. The method according to claim 13, wherein a heating procedure is executed by sequentially operating the at least two radiating portions in said chosen operational configurations, wherein, during the heating procedure, each operational configuration is applied for an equal time, the overall heating time being equally divided among the operational configurations, and wherein data of energy efficiency are obtained by a learning procedure, in which the at least two radiating portions are sequentially operated in several operational configurations and an energy efficiency is calculated for each of said several operational configurations, power of the microwaves radiated in the learning procedure being lower than power of the microwaves radiated in the heating procedure.

* * * * *